United States Patent
Drummond-Murray et al.

(10) Patent No.: US 6,795,946 B1
(45) Date of Patent: Sep. 21, 2004

(54) FAST FRAME ERROR CHECKER FOR MULTIPLE BYTE DIGITAL DATA FRAMES

(75) Inventors: Justin A Drummond-Murray, Chorleywood (GB); Ruben Aszkenasy, Chesham (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/565,481

(22) Filed: May 5, 2000

(30) Foreign Application Priority Data

Mar. 7, 2000 (GB) .............................................. 0005322

(51) Int. Cl.[7] .......................................... H03M 13/00
(52) U.S. Cl. ...................................... 714/758; 714/781
(58) Field of Search ................................ 714/801, 807, 714/781, 776, 774, 758, 759, 52, 48, 800, 779, 712, 724

(56) References Cited

U.S. PATENT DOCUMENTS

| | | | | | |
|---|---|---|---|---|---|
| 5,121,396 | A | * | 6/1992 | Irvin et al. .................. | 714/807 |
| 5,424,971 | A | * | 6/1995 | Yang et al. .................. | 714/758 |
| 5,539,756 | A | * | 7/1996 | Glaise et al. ................ | 714/758 |
| 5,694,407 | A | * | 12/1997 | Glaise ......................... | 714/807 |
| 5,815,422 | A | * | 9/1998 | Dockser ...................... | 708/493 |
| 5,841,684 | A | * | 11/1998 | Dockser ...................... | 708/625 |
| 5,912,881 | A | * | 6/1999 | Glaise et al. ................ | 714/758 |
| 6,014,767 | A | * | 1/2000 | Glaise ......................... | 714/776 |
| 6,029,186 | A | * | 2/2000 | DesJardins et al. ......... | 708/492 |
| 6,075,774 | A | * | 6/2000 | Lorenz et al. .............. | 714/758 |
| 6,189,124 | B1 | * | 2/2001 | Glaise ......................... | 714/758 |
| 6,263,470 | B1 | * | 7/2001 | Hung et al. ................. | 714/784 |

FOREIGN PATENT DOCUMENTS

| FR | EP 0614294 A1 | * | 3/1993 | ............ H04L/1/00 |
|---|---|---|---|---|
| GB | 2 303 029 | | 2/1997 | |
| GB | 2 334 189 | | 8/1999 | |

* cited by examiner

*Primary Examiner*—David Ton
*Assistant Examiner*—Mujtaba Chaudry
(74) *Attorney, Agent, or Firm*—Nixon & Vanderhye P.C.

(57) ABSTRACT

Apparatus for performing a cyclic redundancy code check on a binary digital signal consisting of a variable multiplicity (M) of data bytes comprises a buffer register for temporarily storing in succession segments each consisting of an integral number (N) of bytes. Each successive segment is loaded into a cyclic redundancy checker which produces a remainder after performing polynomial division of the digital signal. When the number of bytes of the digital signal in the last segment is less than the integral plurality (N) that last segment is padded with constant data. The signal is deemed valid if the remainder matches any of a plurality of predetermined remainders each corresponding to the operation of the checker on a valid digital signal padded with zero to (N-1) bytes of the constant data

18 Claims, 2 Drawing Sheets

FAST FRAME ERROR CHECKER FOR MULTIPLE BYTE DIGITAL DATA FRAMES

FIELD OF THE INVENTION

This invention relates to the checking of digital signals which include a frame check sequence, particularly Ethernet data packets, which are transmitted over a transmission medium in serial form at high data rates. The general object of the invention is to speed up the rate of checking preferably to enable a frame or packet to be checked at a speed commensurate with the data rate of the signal.

BACKGROUND OF THE INVENTION

In order to detect whether a data packet or other framed data signal has been corrupted in transmission or processing, it is customary to compute a frame check sequence by performing, in Galois field arithmetic a division of the number represented by the packet data by a selected multiple bit number, normally in the form of an appropriate polynomial of which the order corresponds to the number of bits in the sequence. The frame check sequence represents the 'remainder' of the frame data when that or a conventionally modified form of it is divided by the polynomial. The 'remainder' is added at the end of the packet data when the packet is transmitted. The packet including the frame check sequence may be checked after transmission to determine whether there is any corruption of the packet data (or the frame check sequence).

In some systems, the addition of the frame check sequence at the end of the frame which has been subject to the polynomial division will produce a result which, when divided by the same polynomial, produces all zeros for the remainder. This follows obviously from modular and more particularly Galois field arithmetic. In the particular case of Ethernet packets and others conforming to IEEE Standard 802.3 Section 3.2.8, the polynomial division is preceded by some conventional steps, including complementing the first 4 bytes of the packet not including, the preamble and start of frame delimiter and multiplying by $x^{32}$, and succeeded by other conventional steps such as complementing the result of the division. Moreover the frame check sequence is transmitted with its most significant bit first instead of its least significant bit first. Thus the remainder that is produced when an uncorrupted frame including the frame check sum is divided by the same polynomial as is used for computing, the frame check sum is a non-zero constant (Hex c704dd7b) instead of all zeros. In what follows it will be assumed that the framed data on which the frame check sequence is to be computed is an Ethernet data packet consisting of (or intended to consist of) an integral number of bytes transmitted so as to produce if not corrupted a predetermined non-zero remainder as a result of an FCS check on the received paclet, but the invention is applicable to other framed messages consisting of an integral multiplicity of bytes.

Frame check sequence generators and checkers are well known in themselves. A typical checker is for example the 74F401 checker made by Fairchild Semiconductor Corporation. That checker specifically provides for the generation of a 16-bit frame check sequence and the detection of an appropriate 16-bit remainder when an incoming data stream consisting of the data and check bits is coupled serially into the checker. In itself, frame check sequence checking is not difficult for binary signals. In physical terms, the checker is a register comprising a chain of D-type bistables associated with exclusive-OR gates. The generator (or checker) divides an input binary digital signal by a general polynomial G(x) which may be, for example:

$$G(x)=x^{32}+x^{26}+x^{23}+x^{22}+x^{16}+x^{12}+x^{11}+x^{10}+x^{8}+x^{7}+x^{5}+x^{4}+x^{2}+x+1$$

Where x is the relevant bit of the digital signal.

The main difficulty in high speed FCS checking (and generation) is that the storage devices (e.g. flip-flops) required for the checker cannot conveniently be operated at the same rate as the incoming data rate. More particularly the 'set-up' and 'hold' times for storage elements are of the same magnitude as or greater than a cycle at the incoming data rate. Although it is known to make a FCS check one byte at a time on incoming data which is one byte wide, if the data rate is, for example, 10 gigabits per second, the time required to calculate the running FCS for each byte is only 0.8 nanoseconds.

SUMMARY OF THE INVENTION

The process of FCS checking can be made more rapid if the input data (which may be in serial form or byte-wide form) is converted into parallel segments each consisting of a multiplicity of bytes, for example 16 bytes ( 128 bits). Each of the segments may be de-multiplexed into a buffer register, meaning generally a store in which the bits are stored in parallel, and then shifted to a second register to enable CRC checking to be performed on that segment while the next segment is being de-multiplexed into the first register.

However, a difficulty with such a scheme is that although all valid packets are based on octet (i.e. byte) boundaries, the number of bytes in a packet need not be a fixed multiple of the number of bytes in a segment. More generally, if the first register holds a segment of N bytes and M is the number of bytes in the packet, then M is not necessarily an integral multiple of N. It should be remarked at this stage that if a packet happens to contain odd bits in addition to the last full byte, it is normally ignored in the FCS checking and is handled by 'dribble' circuitry in a media access control device (MAC).

However, because the FCS check is a polynomial division carried out on the data in the packet, the result of the check, if the FCS of the packet is included, will always be a constant for an uncorrupted packet. If therefore a packet is augmented by data which is constant, a frame check sequence calculation performed on the augmented data packet will result in another constant. Furthermore, if the buffer register is incompletely filled by the packet data but is padded with constant data, so that the portion of the register not occupied by packet data of given length is always occupied by the same pad data, it is possible to carry out the frame check sequence checking by performing the check on the packet augmented by the pad data and checking whether the resultant remainder matches any of a limited number of pre-determinable constants, corresponding in number to the number of bytes which the first register can hold.

In numerical terms, if a register can hold 16 bytes ( 128 bits) at a time, the last segment of the packet or frame will consist of between 1 and 16 bytes inclusive. If for example the pad data consists of all '1's, the FCS check which includes tile last segment should yield one of only 16 remainders, each uniquely associated with the different possible number of bytes contained in the last segment of the packet or frame. A similar result is obtained even though the pad data is not all 1's but is, for example an alternating sequence of 0s and 1s, provided that the pad data remains constant. If the pad data should be changed, it would be necessary to recalculate the various possible valid remainders.

Accordingly, the present invention is based on not only the demultiplexing or deserialising of the input data as may be necessary into parallel segments consisting of an integral number bytes, but also the padding of the last segment with constant data and a determination whether the FCS check matches any predetermined FCS values corresponding in number to the number of bytes in a segment.

The pad data may conveniently be provided by preloading a register into which each segment is written so that so far as a segment consists of bytes from the packet or frame the pre-loaded pad data is overwritten. Thus for all but the last segment of a packet the segment will consist of packet bytes whereas the last segment will comprise X bytes of packet data, wherein X may be from 1 to N, and Y bytes of pad data, wherein Y equals (N–X).

Further features of the invention will be apparent from the drawings.

DETAILED DESCRIPTION OF AN EXEMPLARY EMBODIMENT

Figure 1:
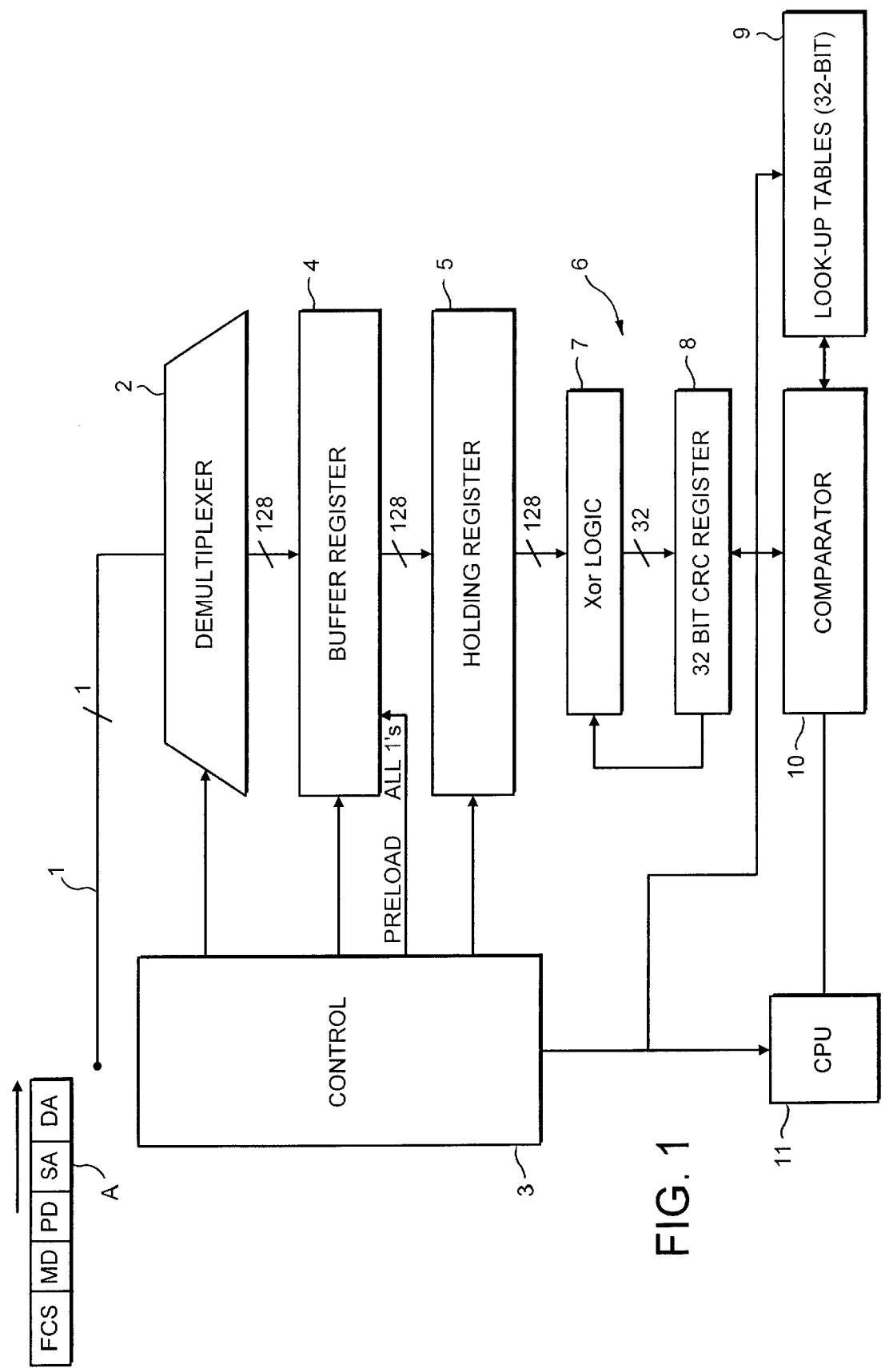
FIG. 1 is a schematic diagram of a fast FCS checker according to the invention.

FIG. 1 of the drawings illustrates a frame check sequence checker according to the invention. The checker may be incorporated in a media access control (MAC) device in a network unit such as a switch, hub or router. The checker is intended for performing an FCS (or CRC) check on input data packets in serial form and consisting essentially of an integral number of data bytes. An example is given by a typical Ethernet packet A which in a received form normally consists of a destination address (typically 6 bytes), a source address (typically 6 bytes), protocol data PD, which may include network addresses, category or priority data and other control data, followed by message data MD. Although in some network regimes the length of a packet is predetermined and constant (for validity), no such restriction applies to Ethernet packets. The message data may consist of a variable number of bytes. It is presumed that packet extensions and dribble bits can be removed or ignored.

Figure 2:
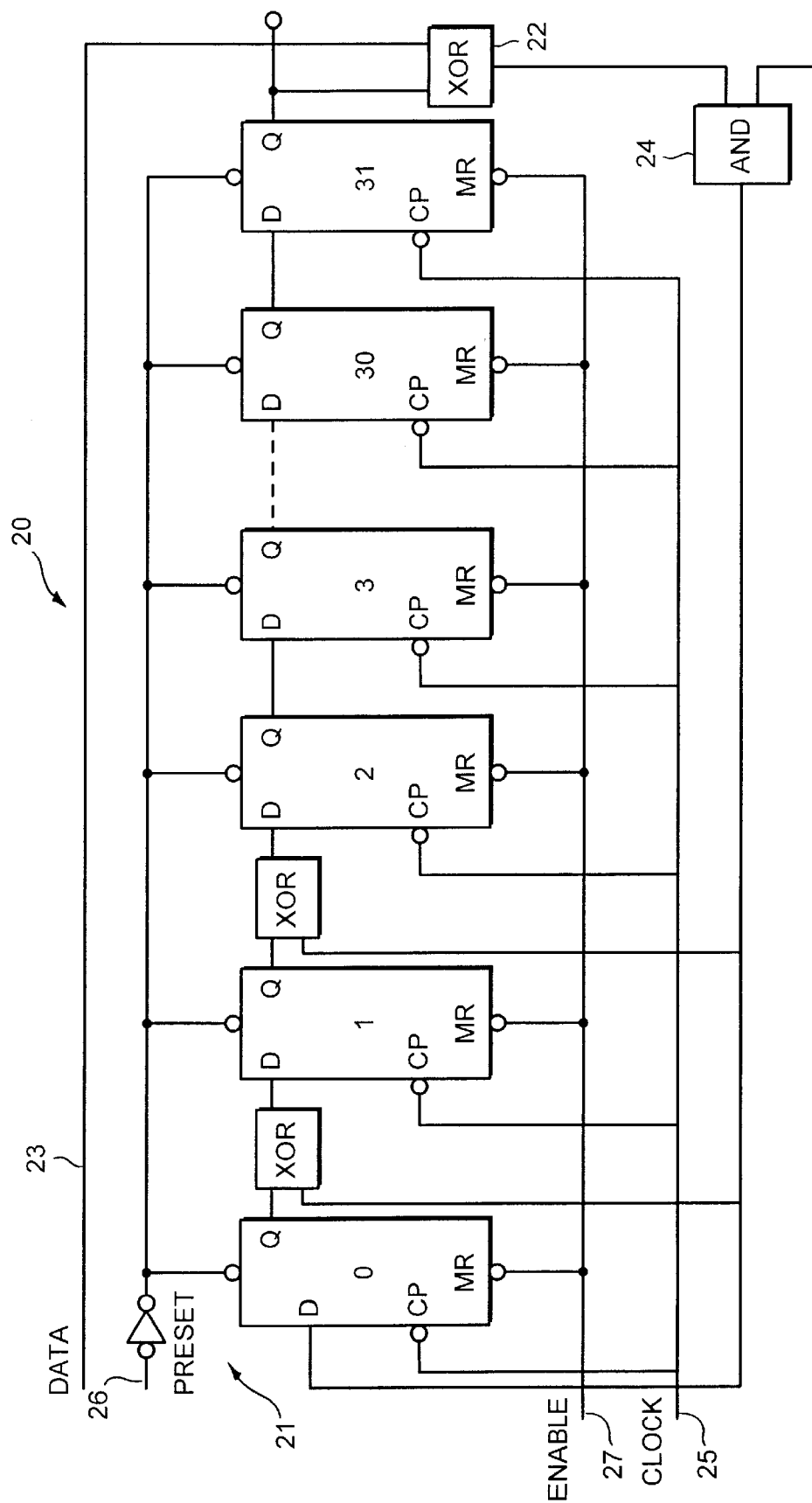
FIG. 2 is an equivalent circuit of a CRC checker.

A packet such as the packet A is transmitted with a frame check sequence FCS which may, for example, by computed by means of the CRC generator shown in FIG. 2. Since FCS generation and checking is achieved by means of a division (in a Galois field of order 2), by the same polynomial. The same circuit can in principle be used for both the generation of the frame check sequence and the checking of the integrity of the packet including the frame check sequence. Before the remainder of FIG. 1 is described, the generator shown in FIG. 2 will be briefly described. It is constructed on the same principles as, for example, the 74F401 cyclic redundancy code generator/checker made by Fairchild Semiconductor Corporation. It comprises in this example a chain 21 of 32 D-type flip-flops (denoted '0', '1', '2' and so on up to 31). The Q output of the last stage is coupled to the input of an exclusive-OR gate 22 of which the other input is coupled to a serial data line 23. The output of the exclusive OR gate 22 is coupled to an input of an AND gate 24 of which the other input receives an enabling signal, denotes 'check word enable'. A clock signal on line 25 is coupled to the clock pulse (CP) input of each stage. A preset signal on line 26 is also coupled to a preset input of each stage and the stages are enabled by a signal on line 27. In order, in this example, to effect division by the aforementioned polynomial G(x), the Q output of a given stage is coupled directly to the D input of the next stage where the respective exponent does not appear in the polynomial whereas the Q output is subject to exclusive-OR gating with the output of the exclusive OR gate 22 for every stave where the corresponding exponent appears in the polynomial. It is in any event necessary to couple the output of the exclusive-OR gate 22 to the input of the first stage else a code word of the required length will not be generated.

Thus in the present example, since 1, x and $x^2$ but not $x^3$ appear in the generating polynomial the output of the chain of bistables is connected to the first stage and by way of exclusive-OR gates to the second and third stages but not to the fourth and so on.

A checker based on the generator shown in FIG. 2 will immediately after the reception of the last bit in the packet data for which the frame check sequence is to be computed produce a sequence of 32-bits representing the remainder (frame check sequence). For some types of frame this frame check sequence may simply be added to the end of the data in respect of which it has been computed. In those circumstances if the data and the frame check sequence are subject to division by the same polynomial G(x), the remainder will be zero for an uncorrupted frame. The present invention may be used in such a system. However, specifically for Ethernet packets, the polynomial division is preceded and succeeded by conventional steps and the frame check sequence is transmitted with its most significant bit first instead of its least significant bit. Thus the division of the relevant packet data including the frame check sequence will produce a predetermined constant, defined hexadecimally as c704dd7b.

FIG. 1 includes a demultiplexer as previously indicated, the serial signal on line 1 arrives at the input of a demultiplexer 2 which under clock and framing control from a control 3 deserialises the input signal and directs successive bits in a 128-bit cycle into a buffer register 4. This buffer register is pre-loaded by means of the control 3 with all 1's. The writing of the segment of 128 bits into the buffer register 4 overwrites the pre-loading so that for every 128-bit segment of the input digital signal the buffer register holds 16 bytes of the packet data. On the entry of the last bit of the last byte in the segment in buffer register 4, the content of the buffer register is shifted in parallel out to a 128-bit (16 byte) holding register 5, the buffer register 4 being preloaded with all 1's and then receiving the next 128-bit segment of the input data signal.

The contents of holding resister 5 are read out to a cyclic redundancy checker 6 constituted by exclusive OR logic 7 and a 32-bit register 8 The cyclic redundancy code generator performs a polynomial division on each segment in turn in a manner known in itself More specifically, for each 128-bit segment it may perform the CRC function shown in Table 1. The running resultant is held in the CRC register 8 and at the end of the last segment the result the CRC register is the remainder obtained by dividing the input data (including the frame check sequence) by the generator polynomial.

Table 1 shows a software routing for the performance of polynomial division and more particularly the Verilog, code required to create a 128-bit wide FCS checker. When it is called or instantiated within another section of code it will return the results of the calculation within it.

To call the example in Table 1 the code would look like this:

NewFCS=crc128Calc(OldFCS,Data).

When this section of code is reached the crc128Calc routine is run and the result returned to the NewFCS variable, the OldFCS variable will be mapped to the crcIn and the Data will be mapped to the dataIn variable within the function. Then the function will for each bit in the data proceed to do the polynomial calculation on the data and old FCS until all of the data bits have been used, the data left in the crc128Calc register at the end of the operation is the 'result' that is then returned to the code above.

The 'crcBit' is a temporary variable that is used to count the number of data bits that have been used and will cause the routine to stop once 128 bits have been used. The 'crcTemp' variable is also a temporary variable that is used to apply the polynomial to the appropriate bits in tile FCS calculation by XORing the data and last bit of the FCS together and XORing with the appropriate FCS bits.

Table 1 corresponds to the items 6, 7 and 8 in FIG. 1. When it is synthesised it will produce the physical gates similar to those shown in FIG. 2.

TABLE 1

```
Function  [31 : 0]   crc128Calc;
Input     [31:0]     crcIn;
Input     [127:0]    dataIn;
reg       crcTemp;
reg       [31:0] crcBit;
begin
    crc128Calc = crcIn;
    for (crcBit = 0; crcBit<128;crcBit = crcBit + 1)
    begin
        crcTemp = dataIn [crcBit] ^ crc128Calc[31];
        crc128calc[31] = crc128Calc[30];
        crc128calc[30] = crc128Calc[29];
        crc128Calc[29] = crc128Calc[28];
        crc128Calc[28] = crc128Calc[27];
        crc128Calc[27] = crc128Calc[26];
        crc128Calc[26] = crc188Calc[25] ^ crcTemp;
        crc128Calc[25] = crc128Calc[24];
        crc128Calc[24] = crc128Calc[23];
        crc128Calc[23] = crc128Calc[22] ^ crcTemp;
        crc128Calc[22] = crc128Calc[21] ^ crcTemp;
        crc128Calc[21] = crc128Calc[20];
        crc128Calc[20] = crc128Calc[19];
        crc128Calc[19] = crc128Calc[18];
        crc128Calc[18] = crc128Calc[17];
        crc128Calc[17] = crc128Calc[16];
        crc128Calc[16] = crc128Calc[15] ^ crcTemp;
        crc128calc[15] = crc128Calc[14];
        crc128Calc[14] = crc128Calc[13];
        crc128Calc[13] = crc128Calc[12];
        crc128Calc[12] = crc128Calc[11] ^ crcTemp;
        crc128Calc[11] = crc128Calc[10] ^ crcTemp;
        crc128Calc[10] = crc128Calc[9]  ^ crcTemp;
        crc128Calc[9]  = crc128Calc[8];
        crc128Calc[8]  = crc128Calc[7]  ^ crcTemp;
        crc128Calc[7]  = crc128Calc[6]  ^ crcTemp;
        crc128Calc[6]  = crc128Calc[5];
        crc128Calc[5]  = crc128Calc[4]  ^ crcTemp;
        crc128Calc[4]  = crc128Calc[3]  ^ crcTemp;
        crc128Calc[3]  = crc128Calc[2];
        crc128Calc[2]  = crc128Calc[1]  ^ crcTemp;
        crc128Calc[1]  = crc128Calc[0]  ^ crcTemp;
        crc128Calc[0]  = crcTemp;
    end
end
endfunction
```

As has been mentioned hitherto, the last segment of the packet will not necessarily fill the buffer register 4 completely because, in this example, the number of bytes in the packet need not be a multiple of 16. Thus the last segment will comprise some number between 1 and 16 bytes of input data and the complementary number of bytes of pad data. For each of the integral number of pads of byte data (or the number of bytes in the last segment) there will be a specific remainder if the packet is uncorrupted. For each of the sixteen possibilities the corresponding remainder is shown in hexadecimal form in Table 2.

TABLE 2

| Pad Size (bytes) | FCS Remainder |
| --- | --- |
| 0 | c704dd7b |
| 1 | 104171df |
| 2 | 05b6735a |
| 3 | 80dd4dd3 |
| 4 | f2b110cb |
| 5 | 192d9e7b |
| 6 | 48ba5443 |
| 7 | c2ad45bf |
| 8 | a79c3203 |
| 9 | 0112aa6f |
| 10 | 54db7637 |
| 11 | 7c3094b0 |
| 12 | ae006622 |
| 13 | c960b446 |
| 14 | c532d80f |
| 15 | f6e7fb28 |

If for any of the corresponding sizes of pad the remainder does not equal one of the values in Table 2 then the packet has been corrupted and should be discarded (by means not relevant to the present invention). The constant terms are (liven for pad data constituted by all 1's but could be any value provided that the pad data did not change. If the value of the pad data did change then the remainders for each pad size would have to be recalculated.

The various (in this example 16) valid remainders are held in look-up tables 9 and at the end of the last segment the content of the CRC register 8 can be compared with the stored remainders in the look-up tables by means of a comparator under control of a CPU 11. The packet will be deemed valid if the remainder in register 8 corresponds to a remainder in table 9.

With this system an FCS checker can operate at, for example, 128 MHz for input data at 10 GHz and carry out an FCS check on the data every clock cycle.

It is customary for a physical layer device which converts the data in analogue form on the wire or other transmission medium into digital format for a MAC to provide a framing signal which informs the MAC when the packet starts and finishes.

Thus the control 3 can receive a signal indicating that the end of the packet A has been reached and it is feasible for the control 3 to determine from the number of bytes of packet data in the last segment the particular remainder which should be accessed from the look-up table 9 for comparison with the content of the cyclic redundancy code register 5, so that it is not necessary to compare the remainder from the FCS check with all the stored remainders.

What is claimed is:

1. An apparatus for performing a cyclic redundancy code check on a received binary digital signal comprising a variable multiplicity (M) of data bytes, comprising means for temporarily storing in succession segments each comprising an integral plurality (N) of bytes and for loading each successive segment into a cyclic redundancy checker which produces a remainder after performing polynomial division of the received binary digital signal, means operable, when the number of bytes of the received binary digital signal in the last segment is less than said integral plurality (N), to pad that last segment only at its end with constant data prior to loading into the cyclic redundancy checker and means for determining whether said remainder matches any of a plurality of predetermined remainders each one of which corresponds to the operation of the cyclic redundancy checker on a valid digital signal padded with a different number from zero to (N−1) bytes of the constant data.

2. An apparatus for performing a cyclic redundancy code check on a received input binary digital signal comprising a variable multiplicity (M) of data bytes, comprising:

a buffer register for holding a succession of segments each comprising an integral plurality (N) of bytes;

a cyclic redundancy code checker which is operative to receive said succession of segments and to perform division thereof by a selected polynomial, to produce a remainder;

means for loading segments of said received input binary digital signal in turn into said buffer register;

means for preloading said buffer register with constant data whereby when a last segment in said succession contains a number (X) of bytes of data of said received input binary digital signal and said number (X) is less than said integral plurality (N) the segment contains (N−X) bytes of constant data provided only at the end of the last segment;

means for storing a plurality (N) of predetermined remainders each one corresponding to a remainder value for (X) being a different number from zero to (N−1); and means for determining whether said remainder corresponds to one of said plurality (N) of predetermined remainders.

3. An apparatus as in claim 2 wherein said received input digital signal is in serial form and said means for loading comprises a deserializer receiving the received input digital signal and loading each successive integral plurality of bytes of the input signal into the buffer register.

4. The apparatus as in claim 2 wherein said remainder comprises a multiplicity of bits less than the number of bits in one of said segments.

5. The apparatus as in claim 2 wherein said cyclic redundancy code checker receives said segments each in parallel form.

6. A method of performing cyclic redundancy code check on a received binary digital signal comprising a variable multiplicity (M) of data bytes, comprising:

temporarily storing in succession segments each comprising and integral plurality (N) of bytes;

loading each successive segment into a cyclic redundancy checker;

producing a remainder after performing polynomial division of the received binary digital signal;

when the number of bytes of the received binary digital signal in the last segment is less than said integral plurality (N), causing the padding of that last segment only at its end with constant data; and determining whether said remainder matches any of a plurality of predetermined remainders each corresponding to the operation of the checker on a valid digital signal padded with a different number from zero to (N−1) bytes of the constant data.

7. An apparatus for performing a cyclic redundancy code check on a received input data packet comprising a variable multiplicity (M) of data bytes and including a cyclic redundancy code whereby said cyclic redundancy code check produces, after a predetermined polynomial division, a non-zero remainder when said received input data packet is valid, comprising:

a cyclic redundancy checker for producing a remainder by performing said predetermined polynomial division;

a buffer register for temporarily storing in succession on segments each comprising an integral plurality (N) of bytes whereof N is less than M;

means for loading each successive segment into a cyclic redundancy checker;

means for causing the padding of the last segment only at its end with constant data, when the number of bytes of the data packet in the last segment is less the said integral plurality (N); and means for determining whether the said remainder matches any of a plurality of predetermined remainders each corresponding to the operation of said cyclic redundancy checker on a valid data packet padded with a different number from zero to (N−1) bytes respectively of the constant data.

8. The apparatus as in claim 7 wherein said received input data packet is in serial form and said means for loading comprises a deserializer receiving the received input data packet and loading each successive integral plurality of bytes of the received input data packet into the buffer register.

9. The apparatus as in claim 7 wherein said remainder comprises a multiplicity of bits less than the number of bits in one of said segments.

10. The apparatus as in claim 7 wherein said cyclic redundancy checker receives said segments each in parallel form.

11. Apparatus for performing a cyclic redundancy code check on a received input data packet comprising a variable multiplicity (M) of data bytes and including a cyclic redundancy code whereby said cyclic redundancy code check produces, after division thereof by a selected polynomial, a non-zero remainder when said packet is valid, said apparatus comprising:

a buffer register for holding a succession of segments each comprising an integral plurality (N) of bytes whereof N is less than M;

a cyclic redundancy code checker which is operative to receive said succession of segments and to perform division thereof by said selected polynomial, to produce a remainder;

means for loading segments of said input data packet in turn into said buffer register;

means for preloading said buffer register with constant data whereby when a last segment in said succession contains a number (X) of bytes of said data packet and said number (X) is less than said integral plurality (N) the segment contains (N−X) bytes of constant data provided only at the end of the last segment;

means for storing a plurality (N) of predetermined remainders equal in number to said plurality (N) each ore corresponding to a remainder value for (X) being a different number from zero to (N−1); and means for determining whether the said remainder corresponds to one of said integral plurality (N) of predetermined remainders.

12. The apparatus as in claim 11 wherein said received input data packet is in serial form and said means for loading comprises a deserializer receiving the received input data packet and loading each successive integral plurality of bytes of the received input data packet into the buffer register.

13. A method for performing a cyclic redundancy code check on a received input data packet composed of a binary digital signal comprising a variable multiplicity (M) of data bytes and including a cyclic redundancy code whereby said cyclic redundancy code check produces, after a predetermined polynomial division, a non-zero remainder when said data packet is valid, comprising:

temporarily storing in succession segments each comprising an integral number (N) of bytes;

loading each successive segment into a cyclic redundancy checker;

producing a remainder after performing said polynomial division of the digital signal;

when the number of bytes of the digital signal in the last segment is less than said integral plurality (N), causing the padding of that last segment only at its end with constant data; and determining whether said remainder matches any of a plurality of predetermined remainders each one of which corresponds to the operation of the cyclic redundancy checker on a valid digital signal padded with a different number from zero to (N−1) bytes respectively of the constant data.

14. A method for performing a cyclic redundancy code check on a received binary digital signal comprising a variable multiplicity (M) of data bytes, comprising:

temporarily storing in succession segments each comprising an integral plurality (N) of bytes, loading each successive segment into a cyclic redundancy checker;

producing a remainder after performing polynomial division of the received binary digital signal;

when the number of bytes of the received binary digital signal in the last segment is less than said integral plurality (N), causing the padding of that last segment with constant data which produces for said binary digital signal a respective predetermined remainder depending on the number of bytes of said constant data; and determining whether said remainder matches any of a plurality of predetermined remainders each corresponding to the operation of the cyclic redundancy checker on a valid digital signal padded with a different number from zero to (N−1) bytes of the constant data.

15. An apparatus for performing a cyclic redundancy code check on a received input data packet comprising a variable multiplicity (M) of data bytes and including a cyclic redundancy code whereby said cyclic redundancy code check produces, after a predetermined polynomial division, a non-zero remainder when said received input data packet is valid, comprising:

a cyclic redundancy checker for producing a remainder by performing said predetermined polynomial division;

a buffer register for temporarily storing in succession segments each comprising an integral plurality (N) of bytes whereof N is less than M;

means for loading each successive segment into a cyclic redundancy checker;

means for causing the padding of the last segment with constant data which produces for said data packet a respective predetermined remainder depending on the number of bytes of said constant data, when the number of bytes of the data packet in the last segment is less than said integral plurality (N); and means for determining whether the said remainder matches any of a plurality of predetermined remainders each corresponding to the operation of said cyclic redundancy checker on a valid data packet padded with a different number from zero to (N−1) bytes respectively of the constant data.

16. The apparatus as in claim 15 wherein said received input data packet is in serial form and said means for loading comprises a deserializer receiving the received input data packet and loading each successive integral plurality of bytes of the received input data packet into the buffer register.

17. The apparatus as in claim 15 wherein said remainder comprises a multiplicity of bits less than the number of bits in one of said segments.

18. The apparatus as in claim 15 wherein said cyclic redundancy checker receives said segments each in parallel form.

* * * * *